Figure 1:
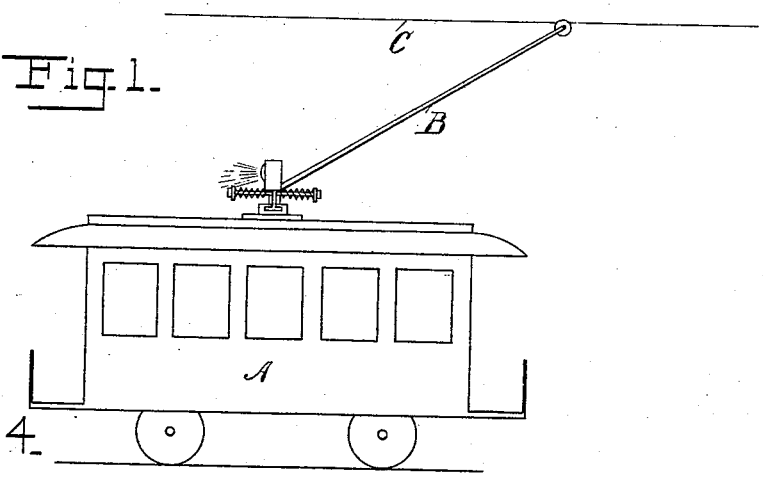

(No Model.) 2 Sheets—Sheet 1.

C. H. BAKER.
SIGNAL LAMP FOR ELECTRIC RAILWAY CARS.

No. 531,146. Patented Dec. 18, 1894.

Witnesses
O. F. Barthel
L. J. Whittemore

Inventor
Charles H. Baker,
By Mh. S. Sprague &c
Atty's.

(No Model.) 2 Sheets—Sheet 2.
C. H. BAKER.
SIGNAL LAMP FOR ELECTRIC RAILWAY CARS.
No. 531,146. Patented Dec. 18, 1894.
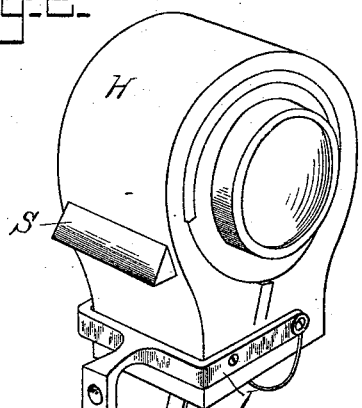
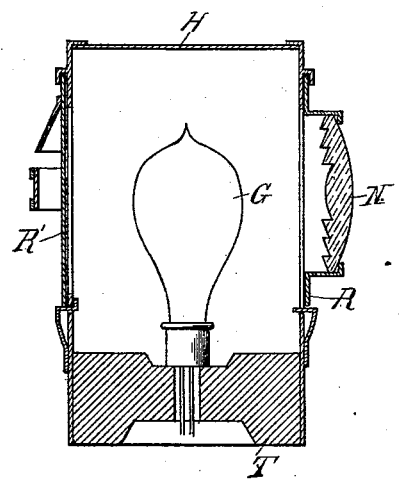
Witnesses
O. F. Barthel
L. J. Whittemore
Inventor
Charles H. Baker
By Thos. S. Sprague & Son
Atty's.

UNITED STATES PATENT OFFICE.

CHARLES H. BAKER, OF DETROIT, MICHIGAN.

SIGNAL-LAMP FOR ELECTRIC-RAILWAY CARS.

SPECIFICATION forming part of Letters Patent No. 531,146, dated December 18, 1894.

Application filed April 24, 1894. Serial No. 508,780. (No model.)

*To all whom it may concern:*

Be it known that I, CHARLES H. BAKER, a citizen of the United States, residing at Detroit, in the county of Wayne and State of Michigan, have invented certain new and useful Improvements in Signal-Lamps for Electric-Railway Cars, of which the following is a specification, reference being had therein to the accompanying drawings.

My invention relates to that class of signal lamps used on street railway cars to designate by its proper color the line or route which the car passes over, so that the patrons can at night distinguish the cars of their own particular route by the color of the light from cars of all other routes. As the light has to appear in the direction in which the car goes, the signal light has to be reversed before starting a car in the opposite direction, or if the car is provided with two signal lamps on opposite ends of the car as in the usual arrangement the colored glass light is transferred from one lamp to the other. As the giving of the signal thus depends on the watchfulness of the conductor he often forgets to attend to it. Besides the necessity of having the lamps within reach brings them very low down and it often happens that the signal is confused with the other lights on the car.

My invention applies to electric trolley cars and consists in the signal lamp placed above the deck of the car and so connected with the trolley that the act of reversing the same at the end of the route reverses the lamp.

My invention further consists in the peculiar arrangement and construction for maintaining an electric lamp by the current derived from the trolley wire, all as more fully hereinafter described and shown in the drawings, in which—

Figure 4:
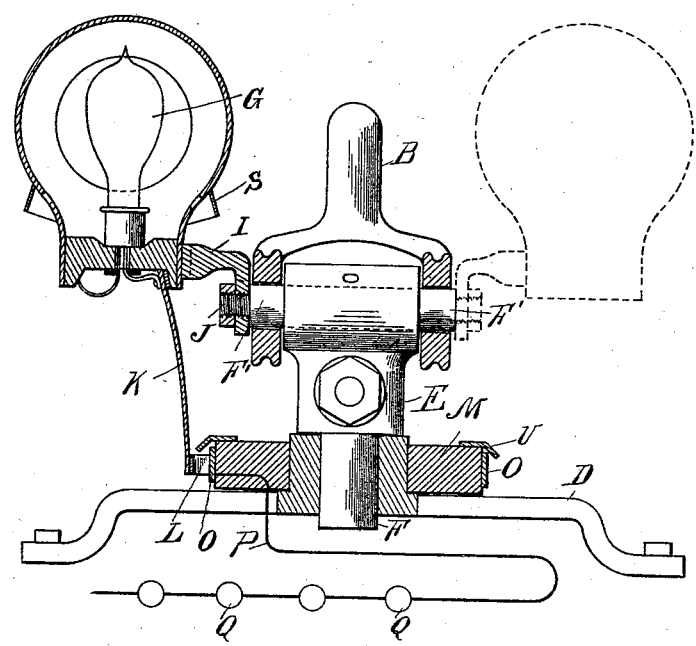

Figure 1 is a diagram of an electric trolley car with my lamp shown in position thereon. Fig. 2 is a perspective view of the lamp detached. Fig. 3 is a cross section of the lamp detached. Fig. 4 is a section of the lamp at right angles to Fig. 3 showing also its connection with the trolley stand in detail.

A is the car, B is the trolley arm and C is the trolley wire of an electric railway illustrating my invention.

As is well known the trolley stand consists of the fixed support D, which is secured upon the deck of the car and a rotary support E generally engages by a pivot pin F with the fixed support and carrying the trolley arm B by means of a pivot pin F, all so arranged as to permit of reversing the trolley arm for starting the car in the opposite direction.

My invention consists in having a signal lamp G secured to the rotary support E of the trolley in any suitable manner which will swing the lamp around in a half circle in the act of changing the trolley.

My invention may be carried out in different ways. I have shown it in the drawings as follows: I provide an electric lamp G inclosed in a suitable casing H, which is secured by means of a bracket I to one end of the pivot pin F of the rotary support in any suitable manner, such as by means of a screw J. One terminal of the lamp is secured to the metallic bracket I whereby it is brought into metallic connection with the trolley support, and the other terminal I connect to a contact spring K, which is insulated from the lamp casing and is provided on its lower end with a segmental contact piece L. To the fixed trolley support D I secure centrally with the rotary support an insulating disk M which carries around its periphery a contact ring O, upon which the contact L of the contact spring is adapted to ride. The contact ring O is secured to one terminal of the lamp circuit P, which in the usual manner enters into the car, and from thence to the ground and includes the usual lamps Q for lighting the car in circuit with it. With the parts thus arranged and constructed as described, it will be seen that the signal lamp is included in the shunt circuit with the usual lamps in the car, and no matter in which direction the trolley arm is turned, the light will be maintained, while at the same time the reversal of the trolley arm turns the lamp one-half circle so as to turn the colored glass light always in the direction in which the car is intended to go.

The lamp casing may be of any suitable description. The one shown in the drawings has the colored lights F secured in a slide R, removably secured in position, while the opposite side of the casing is provided with a similar slide R', which is entirely dark. By this arrangement the slides R R' are interchangeable and if desired both sides of the casing may be provided with glass lenses for the purpose of signaling or otherwise.

I preferably make the lamp casing of sheet metal provided on its sides with suitable apertures guarded by slides S for the purpose of admitting air to prevent heating the casing.

The bottom of the lamp casing I prefer to make of insulated material T which forms a strong base for the lantern to firmly secure the bracket I thereto, protecting the contact ring O from rain, snow or moisture. I secure to the upper edge of the disk M a projecting rubber or flap U.

What I claim as my invention is—

1. The combination with a rotary support of a trolley arm of an electric car, of a signal lamp carried by said support, substantially as described.

2. The combination with the rotary support of the trolley arm of an electric car, of an electric signal lamp carried by said support, and included in the lamp circuit of the car, substantially as described.

3. The combination with the rotary trolley support of an electric car of a signal lamp secured thereto, an electric connection whereby one terminal of the lamp is in fixed connection with the trolley circuit of the car and the other in traveling contact with the branch circuit on the car, substantially as described.

4. The combination with the trolley support of an electric railway car, of an electric signal lamp inclosed in the casing secured to the rotary support of the trolley arm and having one terminal of the lamp in electrical contact therewith, an arm secured to the lamp casing constituting the other terminal of the lamp, and a fixed contact ring with which said arm is adapted to form a traveling electric contact, said contact ring forming one terminal of the lamp circuit on the car, substantially as described.

5. The combination with an electric railway car having a trolley arm hinged to a rotary support, of a signal lamp inclosed in a casing which is secured to one end of the hinge pin of the trolley arm, substantially as described.

6. The combination with a rotary trolley support of the car, of the electric lamp G, its casing H, the bracket I, securing the lamp to the rotary support and electrically connecting one terminal of the lamp in a branch circuit with the trolley wire, the contact ring O, secured to the fixed support of the trolley arm and insulated therefrom, and a traveling contact arm K electrically connecting the other terminal of the lamp with the contact ring O, and the branch circuit P on the car connected to the ring O, all substantially as described.

7. The combination with the trolley arm of the car and its fixed and rotary support, of the electric lamp G, the metallic casing H provided with a bracket I, by means of which the casing is secured to one end of the hinge pin of the trolley arm, and an electric connection for maintaining the lamp in a branch circuit derived from the current of the trolley wire, substantially as described.

In testimony whereof I affix my signature in presence of two witnesses.

CHARLES H. BAKER.

Witnesses:
M. B. O'DOGHERTY,
O. F. BARTHEL.